United States Patent
Moshchuk et al.

(10) Patent No.: US 9,514,647 B2
(45) Date of Patent: Dec. 6, 2016

(54) OPTIMAL ACCELERATION PROFILE FOR ENHANCED COLLISION AVOIDANCE

(75) Inventors: Nikolai K. Moshchuk, Grosse Pointe, MI (US); Shih-Ken Chen, Troy, MI (US); Chad T. Zagorski, Clarkston, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1674 days.

(21) Appl. No.: 12/908,689

(22) Filed: Oct. 20, 2010

(65) Prior Publication Data

US 2012/0101713 A1   Apr. 26, 2012

(51) Int. Cl.
*G08G 1/16* (2006.01)
*B60W 10/184* (2012.01)
*B60W 10/20* (2006.01)
*B60W 30/09* (2012.01)
*B60W 40/064* (2012.01)
(Continued)

(52) U.S. Cl.
CPC ............ *G08G 1/163* (2013.01); *B60W 10/184* (2013.01); *B60W 10/20* (2013.01); *B60W 30/09* (2013.01); *B60W 40/064* (2013.01); *B60W 50/14* (2013.01); *B60W 2050/0026* (2013.01); *B60W 2050/0033* (2013.01); *B60W 2050/143* (2013.01); *B60W 2520/10* (2013.01); *B60W 2520/105* (2013.01); *B60W 2550/148* (2013.01); *B60W 2550/302* (2013.01); *B60W 2550/306* (2013.01); *B60W 2550/308* (2013.01); *B60W 2710/182* (2013.01); *B60W 2710/207* (2013.01); *B60W 2720/106* (2013.01); *B60W 2720/125* (2013.01); *B60W 2720/14* (2013.01)

(58) Field of Classification Search
USPC .......................................... 701/301
See application file for complete search history.

(56) References Cited

U.S. PATENT DOCUMENTS 5,302,007 A * 4/1994 Morita et al. ................ 303/9.73
5,480,221 A * 1/1996 Morita et al. ............... 303/113.5
(Continued)

FOREIGN PATENT DOCUMENTS

DE  10 2008 016 377 A1   10/2009
JP  2003-182544 A   7/2003
(Continued)

*Primary Examiner* — Aaron L Troost
(74) *Attorney, Agent, or Firm* — John A. Miller; Miller IP Group, PLC

(57) ABSTRACT

A system and method for providing an optimal collision avoidance path for a host vehicle that may potentially collide with a target vehicle. The method includes providing off-line an optimization look-up table for storing on the host vehicle that includes an optimal vehicle braking or longitudinal deceleration and an optimal distance along the optimal path based on a range of speeds of the host vehicle and coefficients of friction of the roadway surface. The method determines the current speed of the host vehicle and the coefficient of friction of the roadway surface during the potential collision, and uses the look-up table to determine the optimal longitudinal deceleration or braking of the host vehicle for the optimal vehicle path. The method also determines an optimal lateral acceleration or steering of the host vehicle for the optimal vehicle path based on a friction ellipse and the optimal braking.

20 Claims, 5 Drawing Sheets

(51) Int. Cl.
*B60W 50/14* (2012.01)
*B60W 50/00* (2006.01)

(56) References Cited

U.S. PATENT DOCUMENTS

| | | | |
|---|---|---|---|
| 5,647,647 A * | 7/1997 | Kato et al. | 303/122.09 |
| 5,699,040 A | 12/1997 | Matsuda | |
| 5,842,755 A * | 12/1998 | Sugimoto et al. | 303/186 |
| 6,062,659 A * | 5/2000 | Matsuda | 303/160 |
| 6,212,462 B1 * | 4/2001 | Ohtsu et al. | 701/72 |
| 6,813,562 B2 | 11/2004 | Altan et al. | |
| 6,926,374 B2 | 8/2005 | Dudeck et al. | |
| 7,016,783 B2 | 3/2006 | Hac et al. | |
| 7,487,044 B2 * | 2/2009 | Kitazaki et al. | 701/301 |
| 7,542,835 B2 * | 6/2009 | Takahama et al. | 701/45 |
| 7,617,048 B2 | 11/2009 | Simon et al. | |
| 7,647,180 B2 * | 1/2010 | Breed | 701/301 |
| 7,729,841 B2 * | 6/2010 | Knoop et al. | 701/80 |
| 7,752,061 B2 * | 7/2010 | Wahlbin et al. | 705/4 |
| 7,840,355 B2 * | 11/2010 | Breed et al. | 701/301 |
| 7,848,884 B2 * | 12/2010 | Kawasaki | 701/301 |
| 7,848,886 B2 * | 12/2010 | Kawasaki | 701/301 |
| 7,864,032 B2 * | 1/2011 | Kogure et al. | 340/435 |
| 7,899,616 B2 * | 3/2011 | Breed | 701/423 |
| 7,899,621 B2 * | 3/2011 | Breed et al. | 701/301 |
| 7,949,469 B2 * | 5/2011 | Hattori et al. | 701/301 |
| 7,979,172 B2 * | 7/2011 | Breed | 701/23 |
| 7,979,173 B2 * | 7/2011 | Breed | 701/23 |
| 7,983,802 B2 * | 7/2011 | Breed | 701/1 |
| 7,990,283 B2 * | 8/2011 | Breed | 340/903 |
| 8,000,897 B2 * | 8/2011 | Breed et al. | 701/301 |
| 8,060,307 B2 * | 11/2011 | Matsuno | 701/301 |
| 8,090,537 B2 * | 1/2012 | Nishira et al. | 701/301 |
| 8,155,879 B2 * | 4/2012 | Takagi et al. | 701/301 |
| 8,180,547 B2 * | 5/2012 | Prasad et al. | 701/71 |
| 8,200,419 B2 * | 6/2012 | Shimizu | 701/301 |
| 8,255,144 B2 * | 8/2012 | Breed et al. | 701/117 |
| 8,290,677 B2 * | 10/2012 | Yokoyama et al. | 701/70 |
| 2004/0085197 A1 * | 5/2004 | Watanabe et al. | 340/435 |
| 2005/0192736 A1 * | 9/2005 | Sawada et al. | 701/117 |
| 2007/0112477 A1 * | 5/2007 | Van Zanten et al. | 701/2 |
| 2007/0213911 A1 * | 9/2007 | Trombley et al. | 701/70 |
| 2007/0225914 A1 * | 9/2007 | Kawazoe et al. | 701/301 |
| 2008/0015778 A1 * | 1/2008 | Matsuura et al. | 701/301 |
| 2008/0097699 A1 * | 4/2008 | Ono | 701/300 |
| 2008/0201039 A1 | 8/2008 | Matsuoka et al. | |
| 2008/0269992 A1 * | 10/2008 | Kawasaki | 701/45 |
| 2008/0319610 A1 | 12/2008 | Oechsle et al. | |
| 2009/0037052 A1 | 2/2009 | Ogasawara et al. | |
| 2009/0037055 A1 | 2/2009 | Danner et al. | |
| 2009/0192710 A1 * | 7/2009 | Eidehall et al. | 701/301 |
| 2009/0299593 A1 | 12/2009 | Borchers | |
| 2009/0322500 A1 | 12/2009 | Chatterjee et al. | |
| 2009/0326820 A1 | 12/2009 | Shimizu | |
| 2010/0007480 A1 | 1/2010 | Uozumi et al. | |
| 2010/0241329 A1 * | 9/2010 | Fujimura | 701/70 |
| 2010/0250064 A1 * | 9/2010 | Ota et al. | 701/36 |
| 2011/0125382 A1 * | 5/2011 | Bonfigt et al. | 701/71 |
| 2011/0264300 A1 * | 10/2011 | Tuononen | 701/1 |
| 2011/0295464 A1 * | 12/2011 | Zagorski et al. | 701/41 |

FOREIGN PATENT DOCUMENTS

| | | |
|---|---|---|
| JP | 2004-224309 A | 8/2004 |
| JP | 2006-044445 A | 2/2006 |
| JP | 2008-186122 A | 8/2008 |

* cited by examiner

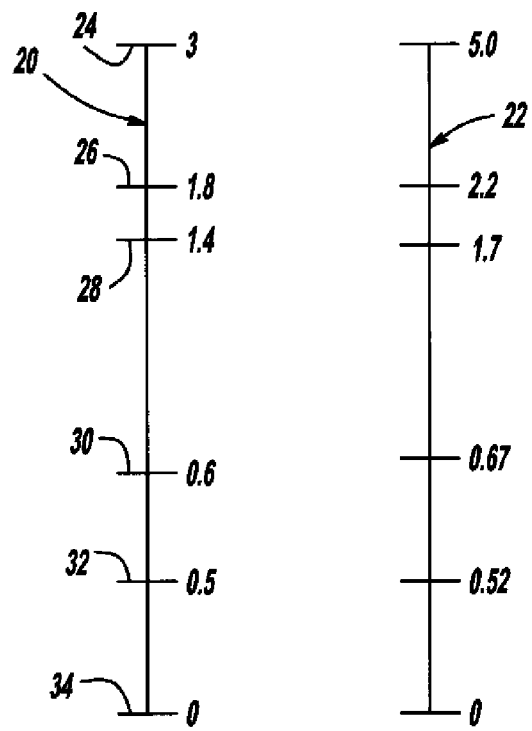
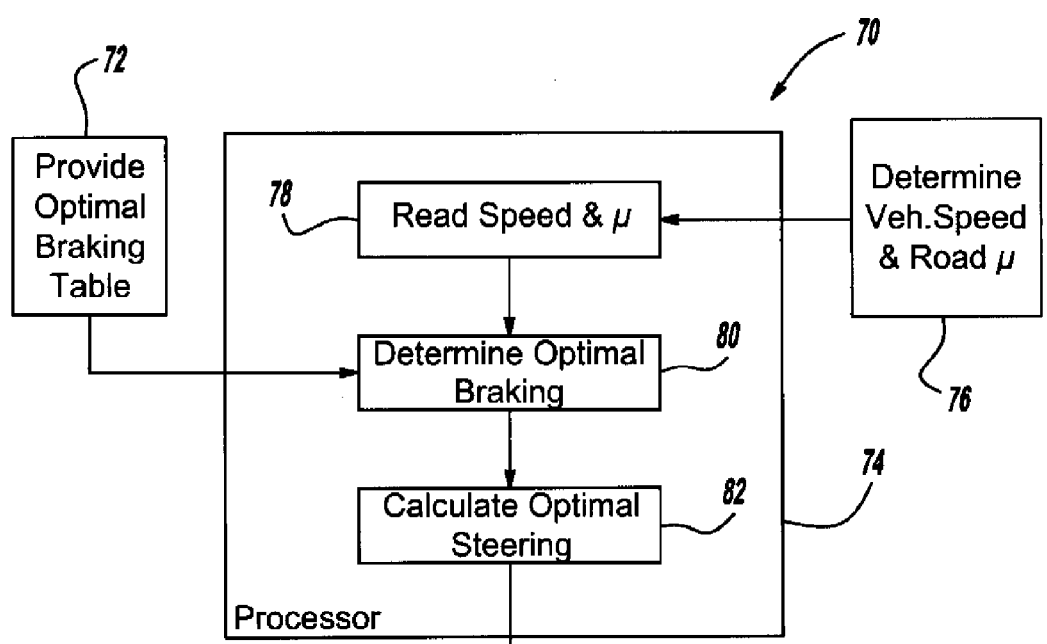
FIG - 3
FIG - 5

OPTIMAL ACCELERATION PROFILE FOR ENHANCED COLLISION AVOIDANCE

BACKGROUND OF THE INVENTION

1. Field of the Invention

This invention relates generally to a system and method for determining an optimal vehicle path and, more particularly, to a system and method for determining an optimal vehicle path for the proper amount of braking and steering during a vehicle collision avoidance maneuver, where the optimal braking is determined by vehicle speed and road surface coefficient of friction using a two-dimensional table generated off-line and the optimal steering is determined based on the optimal braking and a friction ellipse.

2. Discussion of the Related Art

Collision avoidance systems and/or adaptive cruise control systems are known in the art that provide automatic vehicle control, such as braking, if a potential or imminent collision with another vehicle or object is detected, and also may provide a warning to allow the driver to take corrective measures to prevent the collision. For example, adaptive cruise control systems are known that employ a forward looking sensor, such as a radar or lidar sensor, that provides automatic speed control and/or braking if the vehicle is approaching another vehicle. Also, collision avoidance systems are known that employ sensors for determining if a collision with an object may be imminent that may provide vehicle braking even if the vehicle operator is controlling the vehicle.

These types of systems typically employ long-range sensors that have a narrow field-of-view in the near-field of the vehicle. Particularly, the sensor signals emanate from a point source on the vehicle and extend in the forward direction of the vehicle, typically to about 150 meters. The collision warning system transmits a radar or laser beam forward of the vehicle and process reflections from objects in the path of the vehicle. The system generates measurements from the reflections and assesses the potential for a collision based on the vehicle's speed, direction relative to the objects, road surface conditions, etc. The alert can be a visual indication on the vehicles instrument panel or in a head-up display (HUD), and/or can be an audio warning or other haptic feedback device, such as seat shaking.

Heretofore, collision avoidance systems have typically been limited to systems that provide automatic braking in the event that the vehicle driver does not take evasive action in time to prevent a collision. However, collision avoidance systems of this type may benefit from providing combined braking and steering to avoid a collision.

SUMMARY OF THE INVENTION

In accordance with the teachings of the present invention, a system and method are disclosed for providing an optimal collision avoidance path for a host vehicle that may potentially collide with a target vehicle. The method includes providing an optimization look-up table off-line for storing on the host vehicle that includes an optimal vehicle braking or longitudinal deceleration and an optimal distance along the optimal path based on a range of speeds of the host vehicle and coefficients of friction of the roadway surface. The method determines the current speed of the host vehicle and the coefficient of friction of the roadway surface on which the host vehicle is traveling during the potential collision, and uses the look-up table to determine the optimal longitudinal deceleration or braking of the host vehicle for the optimal vehicle path. The method also determines an optimal lateral acceleration or steering of the host vehicle for the optimal vehicle path based on a friction ellipse and the optimal braking.

Additional features of the present invention will become apparent from the following description and appended claims, taken in conjunction with the accompanying drawings.

BRIEF DESCRIPTION OF THE DRAWINGS

FIG. 3 is an illustration showing time in seconds for the host vehicle to take evasive maneuvers to avoid a collision with the target vehicle, or other object, for two different vehicle speeds;

FIG. 5 is a block diagram of a system for determining an optimal vehicle path;

DETAILED DESCRIPTION OF THE EMBODIMENTS

The following discussion of the embodiments of the invention directed to a system and method for defining an optimal vehicle path to provide the proper amount of braking and steering for a collision avoidance maneuver in a host vehicle is merely exemplary in nature, and is in no way intended to limit the invention or its application or uses.

As will be discussed in detail below, the present invention proposes an enhanced collision avoidance (ECA) system for a host vehicle that provides combined automatic braking and steering as a collision with a target vehicle becomes imminent. Although the discussion herein concerns a potential collision of a host vehicle with a target vehicle, the ECA system being discussed has application for a potential collision with any object in front of the host vehicle. The system will provide some type of warning to the driver of the host vehicle as a collision with the target vehicle becomes more probable, and if the driver fails to take evasive action, the collision avoidance system will automatically provide either braking alone, steering alone, or combined braking and steering. Particularly, the ECA system will determine collision judgment lines relative to a time to collision based on various parameters, including vehicle speed, vehicle acceleration, vehicle weight, road coefficient of friction, etc., for providing optimal braking and steering to provide collision avoidance. If the driver fails to initiate a collision avoidance maneuver after an alert is given, the collision avoidance system will automatically provide evasive maneuvering including braking and/or steering if the adjacent lane is clear.

A steering maneuver will only automatically be provided if the speed of the host vehicle is above a predetermined speed threshold.

Figure 1:
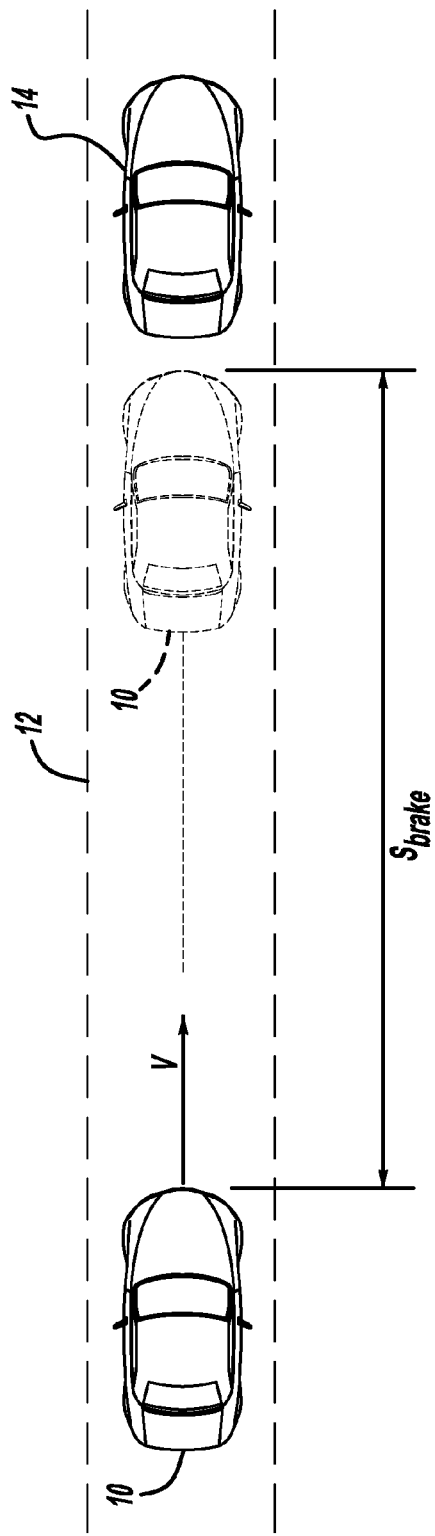
FIG. 1 is an illustration of a host vehicle following a target vehicle on a roadway showing a braking distance.
Figure 2:
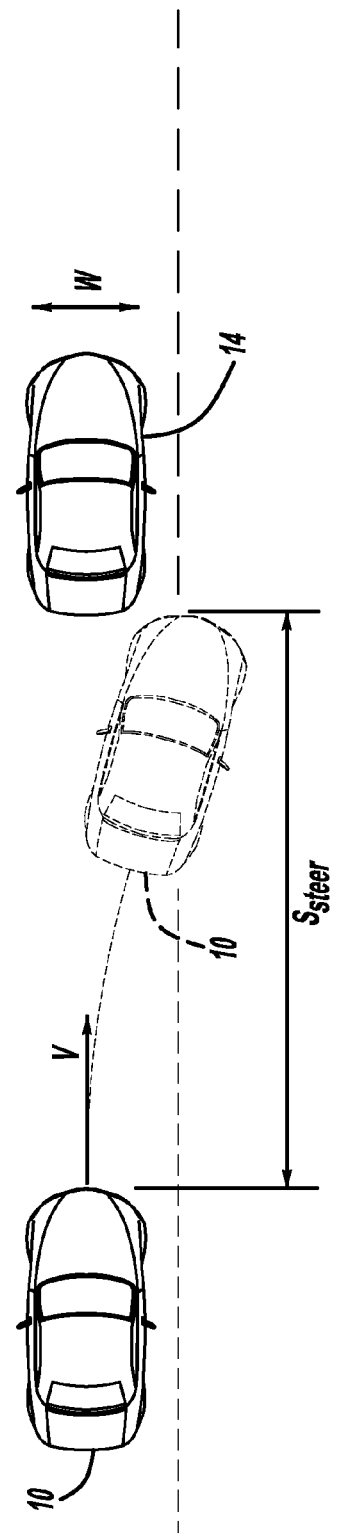
FIG. 2 is the illustration shown in FIG. 1 showing a steering distance and the host vehicle taking an evasive steering maneuver to prevent a collision with the target vehicle.

FIG. 1 is an illustration of a host vehicle 10 traveling on a roadway 12 following a target vehicle 14. As the host vehicle 10 approaches the target vehicle 14 at a speed where a collision will occur if no changes are made, the ECA system will give audible warnings to the vehicle driver to take evasive action, and if none are taken, the collision avoidance may automatically initiate vehicle braking as long as the distance s from the subject vehicle 10 to the target vehicle 14 is greater than a calculated braking distance $s_{brake}$ where braking can be effectively provided to prevent the collision.

If the speed of the host vehicle 12 and the distance s between the host vehicle 12 and the target vehicle 14 becomes too short, the collision avoidance system may then provide automatic steering if the distance s approaches a calculated steering threshold $s_{steer}$, where $s_{steer} < s_{brake}$. If the distance s between the host vehicle 10 and the target vehicle 14 is so short based on the parameters referred to above, then combined braking and steering may be required. The automatic steering will be provided only if the speed of the host vehicle 10 is above a predetermined speed, $V > V^*$, where $V^*$ may be 11 m/sec for high friction roadway surfaces.

FIG. 3 illustrates two collision judgment lines based on a time to collision (TTC) with the target vehicle 14 for determining what action to be taken in the ECA system for two different vehicle speeds. Particularly, collision judgment line 20 is for a host vehicle speed $V_h$ of 10.8 m/sec and collision judgment line 22 is for a host vehicle speed $V_h$ of 20 m/sec. Of course, the values discussed below are vehicle dependent in that different types, sizes, etc. of vehicles will have different collision judgment lines because of their width, weight, performance, handling, etc. Also, as the vehicle speed V changes during the particular time line as a result of braking or other, action, the various times will change. The time to collision (TTC) is a non-linear function of distance d to the target vehicle 14, velocity $V_h$ of the host vehicle 10, velocity $V_t$ of the target vehicle 14, acceleration $A_h$ of the host vehicle 10 and acceleration $A_t$ of the target vehicle 14. The prediction of the host and target vehicle motion is based on the assumption that the host vehicle acceleration $A_h$ and the target vehicle acceleration $A_t$ are both constant in the near future. The actuation delay for both braking and steering is included.

At line 24, a first threshold Th1 is reached where 90% of drivers will initiate some evasive maneuver including braking and/or steering to avoid colliding with the target vehicle 14. For the line 20, the time to collision is about 3 seconds and for the line 22, the time to collision is about 5 seconds. At line 26, a second threshold Th2 is reached where 95% of the drivers will initiate hard braking or steering to avoid a collision with the target vehicle 14. For the line 20, the time to collision is about 1.8 seconds and for the line 22 the time to collision is about 2.2 seconds. The ECA system will be initiating some type of alert during this time frame between the lines 24 and 26 to notify the driver that a potential collision could occur. Line 28 represents the last chance to avoid the collision by hard braking, and is about 1.4 seconds to collision for the line 20 and about 1.7 seconds to collision for the line 22. Once this time frame has passed, then steering only or a combination of braking and steering can prevent the collision. At line 30, a third threshold Th3 is reached, which is the last chance to avoid the collision by steering only. For the line 20, the time to collision is about 0.6 seconds to collision and for the line 22, the time to collision is about 0.67 seconds. After the third threshold Th3 has been passed, then only combined braking and steering can prevent the collision. The last chance to avoid the collision by providing combined braking and steering is at line 32 defined by a fourth threshold Th4 and is about 0.5 seconds to collision for both of the lines 20 and 22.

Figure 4:
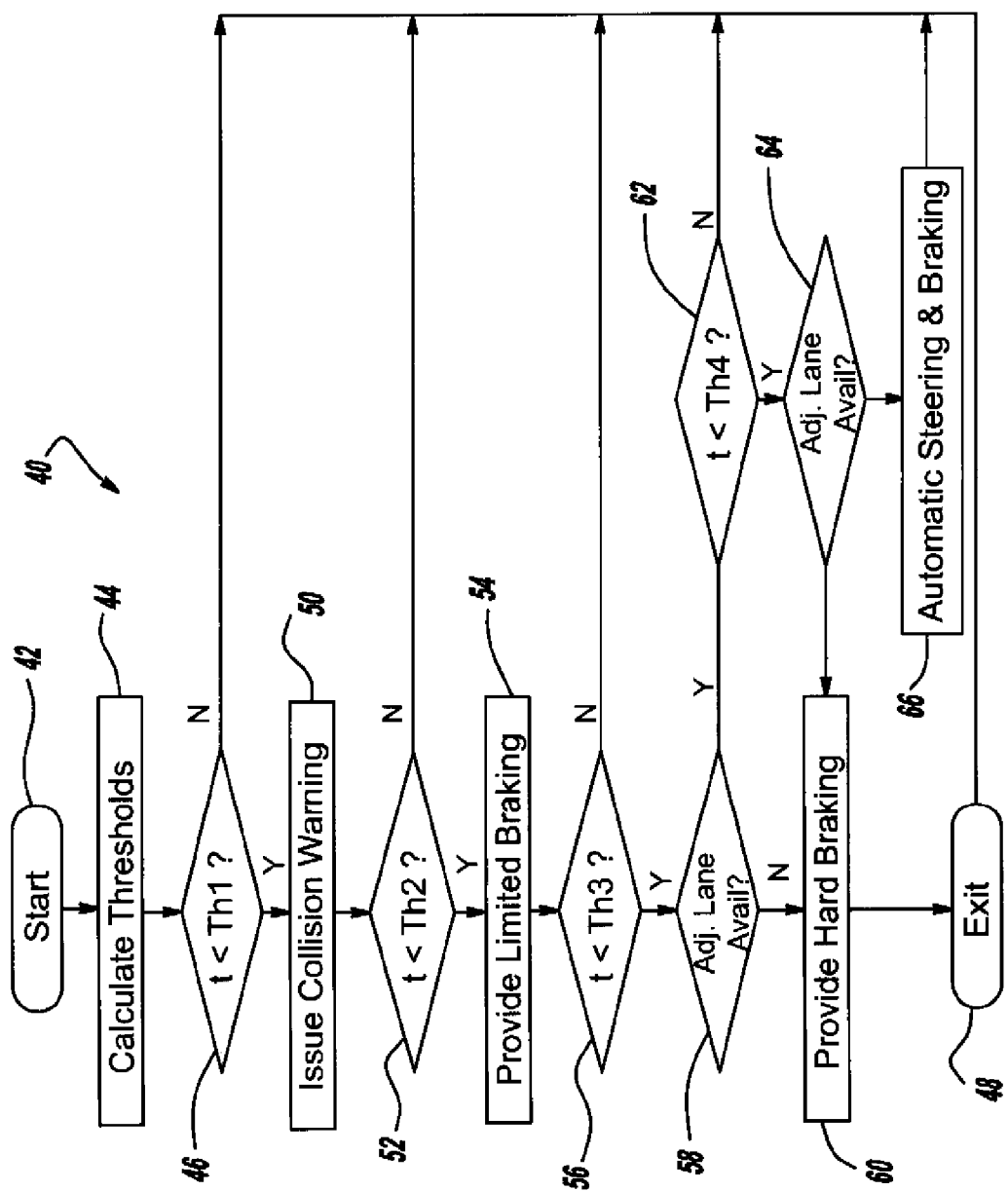
FIG. 4 is a flow chart diagram showing a process for taking evasive maneuvers in the host vehicle to avoid a collision with the target vehicle.

FIG. 4 is a flow chart diagram 40 that illustrates an algorithm for providing the braking and/or steering discussed above in the ECA system using the thresholds Th1, Th2, Th3 and Th4. The algorithm starts at box 42, and based on the various parameters, including the host vehicle speed $V_h$, the target vehicle speed $V_t$, the host vehicle acceleration $A_h$, the target vehicle acceleration $A_t$, the distance d to the target vehicle 14 and the roadway coefficient of friction µ, the algorithm calculates the thresholds Th1, Th2, Th3 and Th4 at box 44. The algorithm then determines if the time to collision with the target vehicle 14 is less than the first threshold Th1 at decision diamond 46, and if not, the algorithm exits at box 48 and then returns to the start box 42. If the time to collision is less than the first threshold Th1 at the decision diamond 46, then the algorithm issues a collision warning at box 50, and then determines whether the time to collision is less than the second threshold Th2 at decision diamond 52. If the time to collision is not less than the second threshold Th2 at the decision diamond 52, then the algorithm exits at the box 48 while still issuing the collision warning, and returns to the start box 42 to begin the process over.

If the time to collision is less than the second threshold Th2 at the decision diamond 52, then the algorithm provides limited automatic braking at box 54, and then determines whether the time to collision is less than the third threshold Th3 at decision diamond 56. The automatic braking at the box 54 is not full collision avoidance braking, but is light braking that will serve as a further warning in addition to the audible alert that is currently being given. In addition, this braking will provide a bit more time for the driver to initiate an avoidance maneuver. If the time to collision is not less than the third threshold Th3 at the decision diamond 56, the algorithm exits the process at the exit box 48 while still providing the automatic braking, where the algorithm will again start the collision avoidance process at the box 42.

If the time to collision is less than the third threshold Th3 at the decision diamond 56 then automatic steering may be provided. The algorithm determines whether the lane adjacent to the target vehicle 14 and the host vehicle 10 is available at decision diamond 58 in preparation to provide automatic steering. If the adjacent lane is not available at the decision diamond 58, then the algorithm provides a hard autonomous collision mitigation braking at box 60, and exits the algorithm at the box 48 to return to the process of determining collision avoidance at the start box 42. If the lane is available at the decision diamond 58, then the vehicle driver is still able to provide a steering maneuver to avoid the collision until the time to collision reaches the fourth threshold Th4. At decision diamond 62, the algorithm determines whether the time to collision is less than the threshold Th4 meaning that the vehicle driver can still avoid the collision by steering, and if not, the algorithm exits at the box 48 and returns to the start box 42. If the lane is available at the decision diamond 58, and the time to collision is less than the fourth threshold Th4 at the decision diamond 62, then the algorithm again determines whether the lane is available at decision diamond 64, and if not, provides the full autonomous collision mitigation braking at the box 60. If the lane is available at the decision diamond 64, then the algorithm causes the ECA system to perform both automatic combined steering and braking at box 66 to avoid the collision.

Threshold Th3 is determined based on whether the host vehicle 10 can still make a steering maneuver to avoid the collision with the target vehicle 14. Any suitable technique can be used to determine the threshold Th3, such as using a bicycle model to determine the center of rotation of the host vehicle 10. One suitable example for determining the threshold Th3 using such a bicycle model can be found in U.S. Patent Application Publication No. 2009/0322500, Judgment Line Calculations for a Vehicle Safety System, filed Jun. 25, 2008 assigned to the assignee of this application and herein incorporated by reference.

The optimal combined braking/steering judgment line to determine the threshold Th4 is based on a relationship between braking and steering where more braking requires less steering and more steering requires less braking. In one embodiment, the threshold Th4 is determined by:

$$Th4 = \frac{1}{2}\sqrt{\frac{s_1}{A_{x0}}} \ln\frac{v_h + \sqrt{A_{x0}s_1}}{v_h - \sqrt{A_{x0}s_1}} + \Delta t \quad (1)$$

Where $V_h$ is the host vehicle speed, $s_1$ is the distance needed for the steer away maneuver, $A_{x0}$ is the braking level in the beginning of the steer away maneuver, $\Delta t$ is the correction due to actuator delay.

In order to provide an optimal steering path in the ECA system for the host vehicle 10 to avoid the collision during a potential collision event, a strategy is employed for the combined braking and steering collision avoidance/-mitigation maneuver if the threshold Th4 has been reached. Because of the amount of math that needs to be used to calculate the optimal path of the host vehicle 10 during the potential collision event, some of the calculations are performed off-line and provided in a look-up table, as discussed below. The amount of braking necessary to avoid the collision changes linearly as the distance s traveled by the host vehicle 10 changes. The present invention proposes calculating off-line an optimization to minimize the gap between the host vehicle 10 and the target vehicle 14 to avoid the collision. This off-line optimization generates a two-dimensional table for providing optimal braking in the ECA system. The optimal braking is typically between 0.2-0.4 g depending on the host vehicle speed $V_h$ and the coefficient of friction μ of the roadway. The optimal braking is then calculated on-line during the potential collision event using the two-dimensional look-up table based on the current host vehicle speed $V_h$ and the roadway surface friction μ. The optimal lateral acceleration for the automatic steering is calculated on-line based on the optimal braking and a tire friction ellipse.

FIG. 5 is a block diagram of a system 70 that determines the optimal braking/steering path of the host vehicle 10 when performing the collision avoidance maneuver when the threshold Th4 has been reached. At box 72, the off-line optimization for the longitudinal deceleration (braking) $A_{x0}$ of the host vehicle 10 is generated and is provided as a two-dimensional table in a processor 74 on board the vehicle 10, as will be discussed below.

Figure 6:
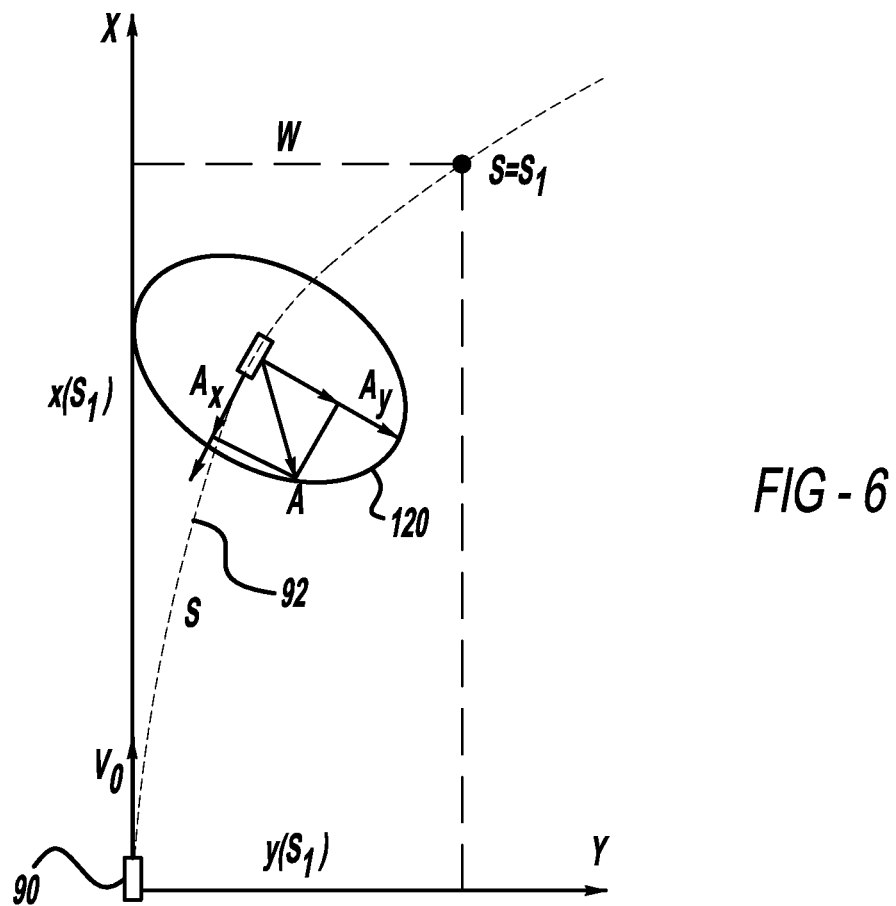
FIG. 6 is a graph showing a vehicle path for an optimal braking profile.

FIG. 6 is a graph for lateral y and longitudinal x distances for the discussion below where the center of gravity (CG) of the host vehicle 10 is at the origin 90 of the graph and the optimal path for braking and steering is shown by graph line 92. The optimization goal of the off-line braking calculations first finds the longitudinal deceleration $A_x(s)$ and the lateral acceleration $A_y(s)$ of the host vehicle 10 so that the distance $X(s_1)$ to the target vehicle shown by the graph is minimized. Here $0 \le s \le s_1$. The equations for the center of gravity (CG) in the distance s domain are:

$$x'' = \frac{A_y}{V_h^2} y' \quad (2)$$

$$y'' = \frac{A_y}{V_h^2} x' \quad (3)$$

$$(V_h^2)' = 2A_x \quad (4)$$

The maximum steering by the host vehicle 10 is limited by the saturation of the tires on the vehicle 10. The constraint for the tire saturation limit is defined by:

$$\left(\frac{A_x}{A_x^{max}}\right)^2 + \left(\frac{A_y}{A_y^{max}}\right)^2 = 1 \quad (5)$$

Also, the ability to steer around the target vehicle 14 is based on the width w of the target vehicle 14. The constraint for the target vehicle width w is defined by:

$$y(s_1) = w \quad (6)$$

From these off-line calculations that determine the longitudinal deceleration $A_{x0}$, or braking, of the host vehicle 10, a two-dimensional table is developed that defines the proper braking $A_{x0}$ for a range of host vehicle speeds and roadway coefficients of frictions μ and identifies the distance $s_1$ necessary to complete the braking maneuver and avoid the collision.

Figure 7:
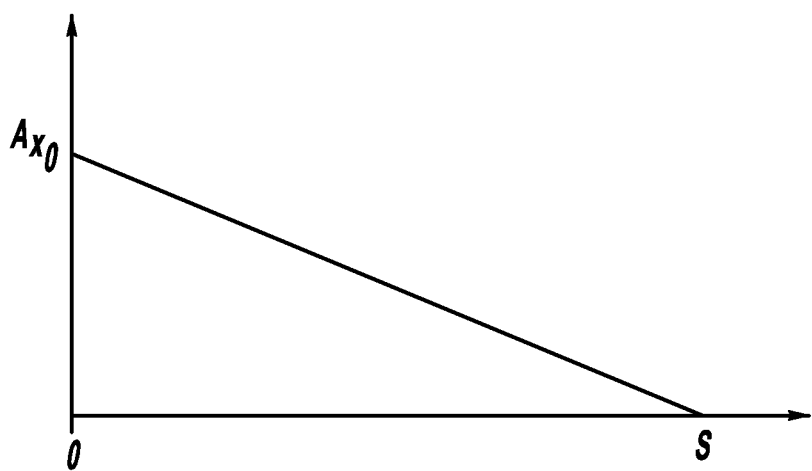
FIG. 7 is a graph with distance on the horizontal axis and braking on the vertical axis showing a linear relationship between optimal braking and a distance to avoid the target vehicle.

As discussed above, the relationship between the braking $A_x$ and the distance s provides a linear function from the vehicle speed $V_h$ and the roadway coefficient of friction μ. FIG. 7 is a graph with distance on the horizontal axis and braking on the vertical axis showing the linear relationship between the braking $A_x$ and the distance s.

At box 76, the vehicle 10 will also include algorithms for estimating or calculating the current longitudinal speed $V_x$ of the host vehicle 10 and the coefficient of friction μ of the roadway 12. Many algorithms are known in the art that can provide these calculations. See, for example, U.S. patent application Ser. No. 12/841,769, titled Methods and Apparatuses for Determining Tire/Road Coefficient of Friction, filed Jul. 22, 2010, assigned to the assignee of this application, and herein incorporated by reference. During the optimal path calculation in the processor 74, the vehicle longitudinal speed $V_x$ and the coefficient of friction μ are read at box 78 from the estimation box 76. Next, the algorithm uses the look-up table to determine the optimal longitudinal deceleration (braking) $A_{x0}$ of the host vehicle 10 for the current speed and coefficient of friction values at box 80.

Figure 8:
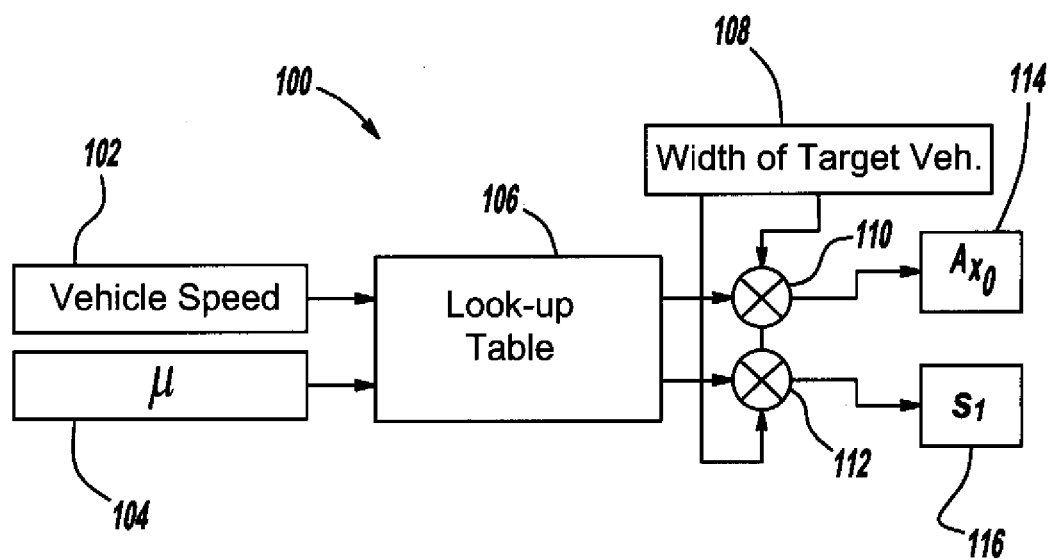
FIG. 8 is a block diagram of a system for calculating optimal braking and minimal distance.

From the two-dimensional look-up table, the optimal braking $A_x$ and distance s can be provided on-line during the collision avoidance maneuver. FIG. 8 is a block diagram of a system 100 where the host vehicle speed $V_h$ is provided at box 102 and the roadway coefficient of friction μ is provided at box 104. These values are applied to the look-up table at box 106 from the off-line calculation to get the optimal braking $A_x$ and the distance s for these values. The optimal braking $A_{x0}$ and the distance $s_1$ from the look-up table are adjusted by the width w of the target vehicle 14 from box 108 in junctions 110 and 112, respectively, to provide the desired braking $A_{x_o}$ at box 114 and the desired distance $s_1$ at box 116.

The algorithm then uses the optimal braking $A_x$ and a friction ellipse at box 82 to calculate the optimal lateral acceleration (steering) $A_y$ of the host vehicle 10 to provide the desired path of the host vehicle 10 for the automatic steering to avoid the collision. For example, the optimal lateral acceleration $A_y$ is calculated based on a friction ellipse 120, shown in FIG. 6, where the lateral acceleration $A_y$ is calculated as:

$$\left(\frac{A_x}{A_x^{max}}\right)^2 + \left(\frac{A_y}{A_y^{max}}\right)^2 \leq 1 \quad (7)$$

$$A_y = A_y^{max}\sqrt{1 - \left(\frac{A_x}{A_x^{max}}\right)^2} \quad (8)$$

As shown by the discussion above, the parameterized braking acceleration $A_x$ is a function of the traveled distance s, where the numerical solution of the differential equation of motion is defined. From this, the optimal braking $A_x(s)$ is a linear function of the distance s, the optimal braking decreases with distance and vanishes at the end of the steer-away maneuver, where $A_x(s_1)=0$, and the optimal braking depends on the initial speed $V_0$, surface friction μ and target vehicle width w.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for providing an optimal collision avoidance path for a host vehicle that may potentially collide with a target vehicle, said method comprising:
    providing off-line an optimization look-up table for storing on the host vehicle that includes a plurality of optimal vehicle braking or longitudinal decelerations and optimal distances based on a range of speeds of the host vehicle and coefficients of friction of a roadway surface;
    determining a current speed of the host vehicle during the potential collision;
    determining a coefficient of friction of a roadway surface on which the host vehicle is traveling during the potential collision;
    determining, using a microprocessor, an optimal longitudinal deceleration or braking of the host vehicle for the optimal path for the current speed of the host vehicle and the coefficient of friction of the roadway surface that the host vehicle is traveling on using the look-up table;
    determining an optimal lateral acceleration or steering of the host vehicle for the optimal path;
    providing the optimal braking and the optimal steering to the host vehicle to follow the optimal path to avoid the collision with the target vehicle; and
    performing steering and braking of the host vehicle based on the optimal braking and the optimal steering.

2. The method according to claim 1 wherein determining the optimal longitudinal deceleration considers a tire saturation limit of the host vehicle.

3. The method according to claim 2 wherein the tire saturation limit is based on the equation:

$$\left(\frac{A_x}{A_x^{max}}\right)^2 + \left(\frac{A_y}{A_y^{max}}\right)^2 = 1$$

where $A_x$ is the longitudinal acceleration and $A_y$ is the lateral deceleration.

4. The method according to claim 1 wherein determining the optimal longitudinal deceleration includes using a width of the target vehicle.

5. The method according to claim 1 wherein determining the optimal lateral acceleration includes using a friction ellipse and the optimal longitudinal deceleration.

6. The method according to claim 5 wherein determining the optimal lateral acceleration uses the equation:

$$A_y = A_y^{max}\sqrt{1 - \left(\frac{A_x}{A_x^{max}}\right)^2}$$

where $A_x$ is the longitudinal deceleration and $A_y$ is the lateral acceleration.

7. The method according to claim 1 wherein a relationship between the optimal vehicle braking and the optimal distance is a linear relationship.

8. The method according to claim 1 wherein providing the optimal braking and the optimal steering includes providing optimal braking and steering where the steering is reduced as the braking is increased and the braking is reduced as the steering is increased.

9. The method according to claim 8 wherein the optimal braking is between 0.2 and 0.4 g.

10. A method for providing an optimal path for a host vehicle, said method comprising:
    providing an optimization look-up table for storing on the host vehicle that includes a plurality of optimal vehicle braking or longitudinal decelerations and optimal distances along the optimal path based on a range of speeds of the host vehicle and coefficients of friction of a roadway surface;
    determining a current speed of the host vehicle;
    determining a coefficient of friction of a roadway surface on which the host vehicle is traveling;
    determining, using a microprocessor, an optimal longitudinal deceleration or braking of the host vehicle for the optimal path for the current vehicle speed and roadway coefficient of friction using the look-up table;
    determining an optimal lateral acceleration or steering of the host vehicle for the optimal path using the optimal longitudinal deceleration and a friction ellipse; and
    performing steering and braking of the host vehicle based on the optimal lateral acceleration or steering.

11. The method according to claim 10 wherein determining the optimal longitudinal deceleration considers a tire saturation limit of the host vehicle.

12. The method according to claim 11 wherein the tire saturation limit is based on the equation:

$$\left(\frac{A_x}{A_x^{max}}\right)^2 + \left(\frac{A_y}{A_y^{max}}\right)^2 = 1$$

where $A_x$ is the longitudinal deceleration and $A_y$ is the lateral acceleration.

13. The method according to claim 10 wherein determining the optimal longitudinal deceleration includes using a width of the target vehicle.

14. The method according to claim 10 wherein determining the optimal lateral acceleration uses the equation:

$$A_y = A_y^{max} \sqrt{1 - \left(\frac{A_x}{A_x^{max}}\right)^2}$$

where $A_x$ is the longitudinal deceleration and $A_y$ is the lateral acceleration.

15. The method according to claim 10 wherein a relationship between the optimal vehicle braking and the optimal distance is a linear relationship.

16. A system for providing an optimal collision avoidance path for a host vehicle that may potentially collide a target vehicle, said system comprising:

means for providing off-line an optimization look-up table for storing on the host vehicle that includes a plurality of optimal vehicle braking or longitudinal decelerations and optimal distances along the path based on a range of speed of the host vehicle and coefficients of friction of a roadway surface;

means for determining a current speed of the host vehicle during the potential collision;

means for determining a coefficient of friction of a roadway surface on which the host vehicle is traveling during the potential collision;

means for determining an longitudinal deceleration or braking of the host vehicle for the optimal path for the current speed of the host vehicle and coefficient of friction of the roadway surface using the look-up table;

means for determining an optimal lateral acceleration or steering of the host vehicle for the optimal path;

means for providing the optimal braking and the optimal steering of the host vehicle to follow the optimal path and to avoid the collision with the target vehicle; and means for performing steering and braking of the host vehicle based on the optimal braking and the optimal steering.

17. The system according to claim 16 wherein the means for determining the optimal longitudinal deceleration considers a tire saturation limit of the host vehicle.

18. The system according to claim 16 wherein the means for determining the optimal longitudinal deceleration uses a width of the target vehicle.

19. The system according to claim 16 wherein the means for determining the optimal lateral acceleration uses a friction ellipse and the optimal longitudinal deceleration.

20. The system according to claim 16 wherein a relationship between the optimal vehicle braking and the optimal distance is a linear relationship.

\* \* \* \* \*